H. KOHLMYER.

RAILWAY TRACK STRUCTURE.

APPLICATION FILED OCT. 7, 1911.

Reissued Feb. 12, 1918. 14,431.

Witnesses:
James H. Marr.
H. H. Lowenstein.

Inventor:
Henry Kohlmyer
by Edward E. Clement
Att'y.

UNITED STATES PATENT OFFICE.

HENRY KOHLMYER, OF LORAIN, OHIO.

RAILWAY-TRACK STRUCTURE.

14,431. Specification of Reissued Letters Patent. Reissued Feb. 12, 1918.

Original No. 993,176, dated May 23, 1911, Serial No. 597,018, filed December 13, 1910. Application for reissue filed October 7, 1911. Serial No. 653,458.

*To all whom it may concern:*

Be it known that I, HENRY KOHLMYER, a citizen of the United States, residing at Lorain, in the county of Lorain and State of Ohio, have invented a new and useful Railway-Track Structure, of which the following is a specification.

My invention relates to track structures for railways and has for its object the provision of improved supporting and fastening means for rails. Essential features of the invention are a novel form of clip for clamping the rail to the tie or other supporting means, a novel form of tie adapted to cooperate with the said clip, and means for anchoring the entire structure in the roadbed. An additional feature is a novel form of rail chair to be used in combination with said ties and clamping devices.

Briefly stated, the invention as a whole involves the use of a metal tie or its equivalent, having a head plate or flanges provided with notches on opposite edges spaced apart a distance equal to the width of the foot of the rail, and a substantially U-shaped clip adapted to lie in said notches with its opposite ends bent over opposite sides of the foot or base flange of the rail. At the rail joints, chairs are provided consisting of shallow channels resting upon adjacent ties and receiving the rail ends between their side flanges.

My invention is illustrated in the accompanying drawings in which—

Figure 1:
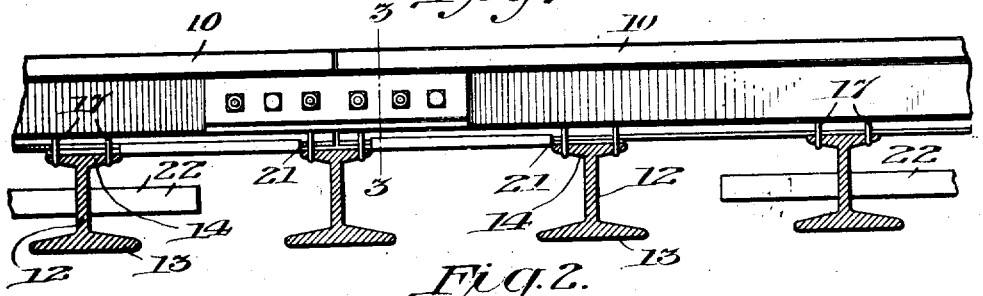
Figure 1 is a vertical longitudinal sectional view through a portion of a railway track, the rails and chair shown in side elevation and the ties being shown in section.
Figure 2:
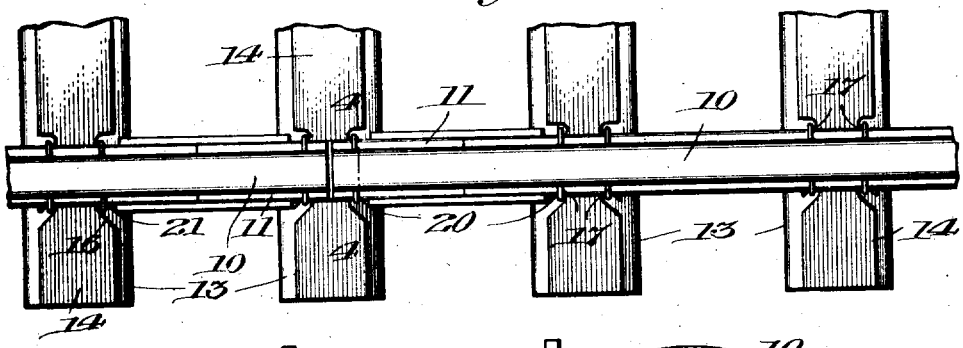
Fig. 2 is a top plan view of the said portion of track.
Figure 3:
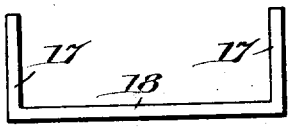
Fig. 3 is a vertical sectional view on the line 3—3 of Fig. 1.
Figure 4:
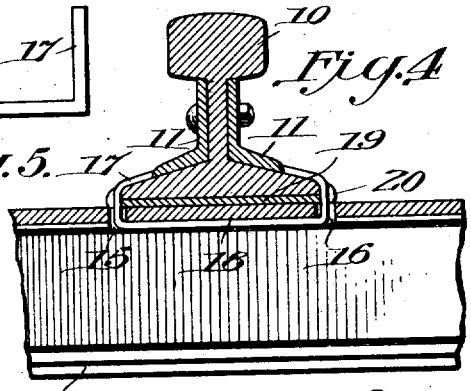
Fig. 4 is a similar view on the line 4—4 of Fig. 2.

In the drawings, there are shown two rails indicated by the numeral 10 and connected by ordinary fish plates 11. The ties for supporting these rails are indicated by the numeral 12 and are preferably in the form of I-beams of suitable length, the base of each tie being indicated by the numeral 13 and the rail supporting head thereof by the numeral 14.

Each tie 12 is formed with notches in the opposite sides or longitudinal edges of its head 14, certain of which are indicated by the numeral 15 and the others by the numeral 16. More specifically speaking, each longitudinal edge of the head of each tie is formed, near each end of the tie, with one of the notches 15 and one of the notches 16. The notches 15 extend inwardly at right angles from the edges of the head in which edges they are formed, whereas the notches 16 extend inwardly at an acute angle from the edges in which they are formed and in a direction toward the corresponding or adjacent notches 15. The distance between the inner ends of each set of notches 15 and 16 is equal substantially to the width of the base flange of the rail disposed upon the head so that the said inner ends of these notches will coincide with the edges of the said base flange of the rail. The ties are of course so disposed that the notches 15 of all of the ties at corresponding ends will be in alinement in the direction of extent of the track way and this also is true of the notches 16. With the ties thus positioned, the rails are properly disposed thereon and are clamped thereto by clamping devices embodying the present invention.

Figure 5:
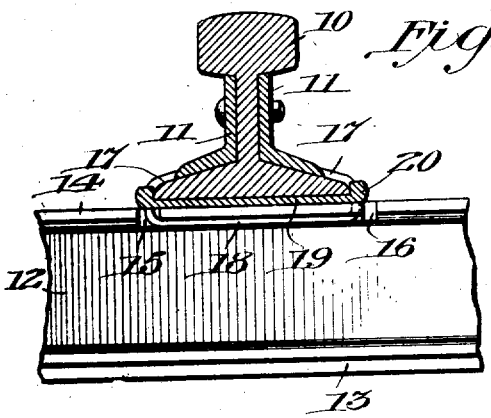
Fig. 5 is a view in side elevation of one of the rail clamps embodying the present invention.
Figure 6:
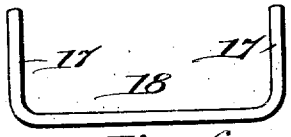
Fig. 6 is a similar view illustrating a slightly modified form of clamp.

Each of the clamps above mentioned is formed either from a length of bar or rod material which is bent to form spaced portions 17 and a connecting portion 18. While these clamps are of stout bar or rod material, they being shown as of the former material in Fig. 5 and as made of the latter material in Fig. 6, they are malleable so that when they are disposed with their spaced portions 17 projecting into the notches 15 and 16, their said spaced portions may be struck down into clamping engagement with the base flange of the rail.

It will be readily understood from an inspection of the drawings that in assembling the clamping devices with the ties, one spaced portion 17 of each clamp is inserted into one of the notches 16 and the clamp then has its other said portion 17 seated in the related notch 15. A support of any suitable sort is then disposed beneath the connecting portion 18 of the clamp and the portions of the parts 17 of the clamp projecting above the base flange of the rail, are struck down with a hammer or other suitable implement. In this manner, the rail is firmly clamped upon the head of the tie. Inasmuch as the spaced portions of the clamp, when struck down into clamping engagement with the base flange of the rail, snugly embrace the said flange, and one of the said portions of each flange is seated in the notch 16 and prevented from leaving this notch, owing to its snug engagement with the base flange of the rail, the other spaced portion will also be prevented from leaving the other notch 15.

At the point of connection of the meeting ends of the two rails, there is provided a rail chair, the base of which is indicated by the numeral 19 and the side flanges by the numeral 20, these flanges receiving between them the base flange of the rail disposed upon the tie. It will be observed that at points coincident with the ties 12, the flanges 20 of the rail chair are cut away as at 21 and that the spaced portions of the clamping devices engage in the cut away portions of the chair so that longitudinal movement of the chair is prevented.

In Fig. 1 I have shown means for anchoring the track structure to the roadbed, comprising bars 22 of suitable material such as wood or steel, passing through openings in the webs of the ties 12, and extending in a direction substantially parallel to that of the rails. These bars, being transverse to the length of the ties, and being embedded with the ties in the concrete or ballast of the roadbed, serve to offer additional resistance to lateral displacement of the track structure, particularly on curves. I have found such provision advantageous in using metal ties, because of the decreased surface bearing or surface friction as compared with the ordinary wooden ties.

Having thus described my invention what I claim and desire to secure by Letters Patent is—

1. In a railway tie, a body having a flat rail supporting head, the head being formed in one side edge with spaced notches, one of the notches being extended toward the other notch at an acute angle to the said edge of the head, the distance between the inner end of the first mentioned notch and the corresponding end of the other notch being substantially equal to the width of the base of a rail supported upon the head, and means for holding a rail to the tie comprising a clamp having spaced portions and a connecting portion, the spaced portions being inserted in the notches and being adapted to be bent into clamping engagement with the rail.

2. In a railway tie, a body having a flat rail supporting head, the head being formed in one side edge with spaced notches, one of the notches being extended toward the other notch at an acute angle to the said edge of the head, the distance between the inner end of the first mentioned notch and the corresponding end of the other notch being substantially equal to the width of the base of a rail supported upon the head, and means for holding a rail to the tie comprising a clamp having spaced portions and a connecting portion, the spaced portions being inserted in the notches and being adapted to be bent into clamping engagement with the rail, the connecting portion of the clamp extending beneath the side of the head between the notches.

3. In a railway tie, a body having a flat rail supporting head, the head being formed in one side edge with spaced notches, the notches being relatively angularly positioned, the distance between the inner ends of the notches being substantially equal to the width of the base of a rail supported upon the head, and means for holding the rail to the head comprising a clamp having spaced portions and a connecting portion, the spaced portions being inserted in the notches and being adapted to be bent into clamping engagement with the rail.

4. In a railway track structure, a tie, a chair disposed upon the tie and having its sides cut away at points coincident with the tie, one side edge of the head of the tie being formed with notches coincident with the side edges of the base flange of the rail, and means for holding the rail upon the tie and chair, said means comprising a clamp having spaced portions and a connecting portion, the clamp being disposed with the spaced portions engaging in the notches near the said edge of the tie and struck down into clamping engagement with the base flange of the rail, the said spaced portions engaging in the cut away portions of the chair.

5. In a railway track structure, a supporting plate having notches in its edges arranged in pairs, the mouths of the notches of each pair being farther apart than the bottoms thereof, a rail carried upon the plate with its edges adjacent said notches, and a clamp for said rail having spaced portions and a connecting portion, the spaced portions being inserted in the notches, positioned at the bottoms thereof, and adapted to be bent into clamping engagement with the rail.

In testimony whereof I affix my signature in the presence of two witnesses.

HENRY KOHLMYER.

Witnesses:
IGNATZ KOSCHLEDER,
ADOLPH KOHLMYER.